United States Patent Office 3,770,665
Patented Nov. 6, 1973

3,770,665
PROCESS OF MAKING AN OPEN-CELLED VINYL CHLORIDE POLYMER PLASTISOL
Wolfgang Jurgeleit and Hermann Winter, Marl, Germany, assignors to Chemische Werke Huls, Marl, Germany
No Drawing. Filed May 26, 1972, Ser. No. 257,245
Claims priority, application Germany, May 29, 1971, P 21 26 950.1
Int. Cl. C08j 1/16
U.S. Cl. 260—2.5 P                1 Claim

ABSTRACT OF THE DISCLOSURE

Sold polymers and copolymers of vinylchloride having particularly utility in the preparation of open-cell soft foam materials are prepared by emulsifying a dispersion of material selected from the group consisting of vinylchloride monomers and a mixture of vinylchloride monomers and unsaturated polymerizable compounds with an emulsifier mixture comprising:
(a) The calcium salt of an alkyl benzenesulfonic acid having 8–16, preferably 12 carbon atoms in the alkyl chain;
(b) A compound having the formula

$$R\text{---}(A)_x\text{---}O\text{---}(CH_2\text{---}CH_2\text{---}O)_n\text{---}H$$

wherein

A represents a C=O group or a phenyl group,
R represents an alkyl group having 8–20, preferably 12–18 carbon atoms,
$n$ represents integers from 4 to 12, preferably 4 to 6, and
$x$ stands for zero or 1 wherein the emulsifier mixture is about 0.1 to 5 percent by weight of the material and the weight ratio of (a) to (b) is about 2:1 to 1:2, and drying the emulsified polymerized dispersion by atomization to produce the solid polymers and copolymers. The emulsifier mixture may be added to the dispersion of material before polymerization, after polymerization, or a portion may be added before and another portion after polymerization.

CROSS REFERENCES TO RELATED APPLICATIONS

Applicants claim priority under 35 U.S.C. 119 for application P 21 26 950.1, filed May 29, 1971 in the Patent Office of the Federal Republic of Germany.
Applicants incorporate by reference the disclosure of U.S. application Ser. No. 257,246 of Burkhard Kuhlow et al., entitled "Process for the Production of Open-Cell Soft Foam Materials From Plastisols Containing Polyvinylchloride or Vinylchloride Copolymers" filed May 26, 1972.

BACKGROUND OF THE INVENTION

The field of the invention is synthetic resin interpolymers of polymerized unsaturated compounds and polymerized unsaturated compounds from halogenated hydrocarbons comprising acyclic vinyl halides.
The present invention is particularly concerned with polyvinylchloride resin powders produced by emulsion polymerization, the process for the manufacture thereof, and the use of the synthetic resin powders.
The state of the prior art may be ascertained by reference to the "Encyclopedia of Polymer Science and Technology," vol. 5, under the section "Emulsion Polymerization," pages 801–859; the Kirk-Othmer "Encyclopedia of Chemical Technology," vol. 14 (1955) under the section "Vinylchloride," pages 723–735, particularly pages 727–730; Kirk-Othmer ibid, 2nd ed., vol. 7 (1965), under the section "Drying," pages 360–368; PB-Report 40 908, PB-Report 949 part II, and Fiat Final Report 862 (cf. Calvin E. Schildknecht, Vinyl and Related Polymers, New York 1952, page 396).
According to the prior art, polyvinylchloride is processed, with plasticizers, into pasty castable compositions, called pastes or plastisols. Furthermore, it is known that these pastes or plastisols can be processed into soft foam materials, wherein the manufacture of so-called "whipped foam" by beating air into emulsifier-containing pastes with subsequent gelling is of particular economic and technical interest.
When these foam materials are produced, it is desirable to obtain fine-pored products of a uniform cellular size and a low density. Besides, it is desirable to have the emulsifier content as low as possible, since comparatively high emulsifier concentrations do not only cause high costs, but also impair the properties of the final product, such as, for example, the mechanical strength and the so-called color blooming.
However, the use of low amounts of emulsifier presents problems, particularly if the foamed plastisol is subjected to a certain intermediate storage between production and gelling, which is unavoidable in manufacturing operations. The foam, generated by beating air into the material, must thus be stable over certain time periods, i.e. it must not break down prior to or during the gelling step.
In order to carry out the foam whipping procedure, various emulsifiers and emulsifier systems have already been employed.
For the production of the plastisol, it is known from German published application DAS 1,254,863 to use plasticizers containing alkali salts of higher fatty acids as the emulsifiers. These alkali salts are preferably alkali oleates. This process which results in the low densities desired only the use of oleates, has the primary disadvantage that the oleic acid exhibits a rather unpleasant odor. In addition thereto, relatively large amounts of emulsifier (potassium oleate) are required, leading to the impairment of the properties of the final product as mentioned above.
According to U.S. Pat. 2,966,470 of Malterfort, which issued Dec. 27, 1960, the finished plastisol is mixed with the emulsifier, which preferably consists of a mixture of an anionic and a nonionic compound. The use of a mixture of the sodium salt of an alkyl aryl sulfonate and a polyethylene glycol tert.-dodecyl thioether is recommended as disclosed at column 2, lines 44 et seq. Although the foam materials produced exhibit a low density, as desired, they have extremely coarse pores. Furthermore, it has to be kept in mind that, according to this process, sufficient foam stability is attained only by the addition of water-soluble colloids, such as polyvinyl alcohol, methylcellulose, gum arabic, etc. However, such additives exert uncontrollable and frequently very disadvantageous effects on the properties of the final products. In particular, these additives imply a high moisture absorption, as well as a strong reduction in the mechanical strength of the foam.
U.S. Pat. 2,861,963 of Butsch, which issued Nov. 25, 1958, teaches the addition of the emulsifier system to the finished plastisol. The emulsifier system contains in this case, an anionic emulsifier, such as alkali alkyl sulfate, a nonionic emulsifier, and as a third component ethylenediaminetetraacetate. It is readily understandable that the addition of a third, comparatively valuable component renders the process expensive. Furthermore, the foam densities attainable do not range below 0.45 g./cm.³.
In Dutch patent application 6813412 (laid open to inspection), a vinyl resin preparation, e.g. a polyvinylchloride powder, is described as suitable for the production of foam from plastisols. The particles of this powder contain an emulsifier system having the following components:

(1) alkali alkyl sulfate, e.g. sodium lauryl sulfate;
(2) alkali soap, e.g. potassium laurate;
(3) alkanolamide, e.g. diethanol lauramide; and
(4) a condensation product of ethylene oxide with an alcohol, a phenol, or an acid, e.g. lauric acid, condensed with 8 moles of ethylene oxide.

This emulsifier system is added to the monomer prior to the polymerization. After working up the latex, for example by spray drying, a large portion of the amount of emulsifier employed is found adsorbed on the particles obtained.

There are advantages in handling such a polyvinylchloride powder for the production of soft foam material because the powder can be prepared readily into a paste with the plasticizer. However, it is to be kept in mind that large quantities of emulsifier must be used in order to obtain a sufficiently stable foam. The amounts of emulsifier to be used are at least 10–15 percent by weight.

However, as set forth hereinabove, the use of high amounts of emulsifier entails, in addition to greater expenses, also other considerable disadvantages. Additionally, it is to be remembered that the use of an emulsifier system consisting of four different components represents a considerably complicated procedure.

SUMMARY OF THE INVENTION

A synthetic polyvinylchloride resin powder produced by emulsion polymerization has now been developed which does not exhibit the above-described disadvantages of the state of the art. This synthetic resin powder contains an emulsifier mixture, consisting of:

(a) The calcium salt of an alkyl benzenesulfonic acid having 8–16, preferably 12 carbon atoms in the alkyl chain, and
(b) A compound of the formula:

wherein

A represents a

group or a phenyl group,
R represents an alkyl group having 8–20, preferably 12–18 carbon atoms,
$n$ represents integers from 4 to 12, preferably 4 to 6, and
$x$ stands for zero or 1.

The synthetic resin powders contain about 0.1–5 percent by weight, preferably 0.5–3.0 percent by weight, of the emulsifier mixture.

The emulsifier components (a) and (b) are preferably present in a weight ratio of about (a):(b) as 2:1 to 1:2, especially 1.7:1 to 1:1.2.

It was found to be particularly advantageous that as large a portion as possible of the emulsifier mixture is present on the surface of the particles in the adsorbed condition.

This especially advantageous form of the synthetic resin powders of this invention is produced by polymerizing the monomer or monomers in the usual manner in emulsion, adding the emulsifier mixture (a)+(b) to the latex obtained, and finally processing the treated latex by spray drying.

DESCRIPTION OF THE PREFERRED EMBODIMENTS

As component (a) of the above-mentioned emulsifier system, the calcium salt of n-dodecylbenzenesulfonic acid is preferably employed. The calcium salt of n-dodecylbenzenesulfonic acid is prepared by sulfonation of n-dodecylbenzene with oleum as described in H. F. Fierz-David and L. Blangey, Grundlegende Operationen der Farben- chemie, 8th ed., Vienna 1952, page 79, with subsequent neutralization of the sulfonic acid thus formed by calcium hydroxide, and a final removal of the precipitated calcium sulfate.

Further examples of the calcium salts of alkylbenzenesulfonic acids include the calcium salts of the n-decyl-, n-undecyl-, n-tridecyl-, n-tetradecyl-, and cetyl-benzenesulfonic acid; the calcium salts of the 3-ethyloctyl-, 2-ethylhexyl-, and di-ethyloctyl-benzenesulfonic acid.

The following compounds are useful as component (b) wherein the general formula has $x=0$:

Alkyl polyglycol ethers, the alkyl group of which is 8–20 carbon atoms and is straight-chain or branched and optionally unsaturated, while the degree of oxyethylation is between 4 and 12.

Examples of the basic alcohols of the polyglycol ethers are: capryl alcohol, nonyl alcohol, capric alcohol, undecyl alcohol, lauryl alcohol, tridecyl alcohol, tetradecyl alcohol, pentadecyl alcohol, palmityl alcohol, heptadecyl alcohol, stearyl alcohol, or also unsaturated alcohols, such as oleyl alcohol. It is also advantageous to oxyethylate the commercial mixtures of several of these alcohols and use them in this form. Preferably, the alcohols reacted with 4–6 moles of ethylene oxide are used.

British Pat. 1,027,481 of Aalbers et al., published Apr. 27, 1966, discloses the preparation of compounds of the general formula

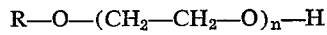

Furthermore, the following compounds are useful as component (b) where $x$ in the general formula is 1 and A is phenyl: n-alkyl aryl polyglycol ethers, the alkyl chain of which contains 8–20, preferably 10–18 carbon atoms. Examples of suitable compounds for the oxyalkylation are: nonylphenol, octyl phenol, (2-ethylhexyl)-phenol, dodecylphenol. Preferably, the alkyl phenols are reacted with 4–12 moles of ethylene oxide.

The preparation of compounds of the general formula wherein $x$ is 1 and A is phenyl is disclosed in Houben-Weyl, Methoden der organischen Chemie, vol. 14, Makromolekulare Chemie, Part I, page 451, Example 9.

As component (b) wherein the general formula has $x=1$ and A is C=O, the following substances are included: fatty acid polyglycol esters, wherein the alkyl group of the fatty acid contains 8–20 carbon atoms, preferably 10–18 carbon atoms, and the alkyl group is branched or unbranched and optionally unsaturated.

Suitable fatty acids, the oxyethylates of which are useful include: caprylic acid, pelargonic acid, lauric acid, myristic acid, palmitic acid, stearic acid, oleic acid, linoleic acid. Advantageously commercially available mixtures of these fatty acids can be used for the oxyalkylation. Preferably, the fatty acids are reacted with 4–12 moles of ethylene oxide.

The preparation of compounds of the general formula wherein $x$ is 1 and A is C=O is disclosed in the German patent application P 29,684/1948 (assigned to CIBA) and Brit. Pat. 670,153/1952 (assigned to Societé Carbochimique; cf. Chem. Abstracts 1952, 8663 h).

The components (a) and (b) are present in the above-mentioned emulsifier mixture preferably in a weight ratio of (a):(b) as 2:1 to 1:2, preferably 1.7:1 to 1:1.2. However, weight ratios deviating from the aforementioned values are likewise possible; in particular a higher concentration of component (a) in the mixture can be advantageous in certain compositions. The emulsifier mixture containing the components (a) and (b) can be added directly to the polymerization charge. It is also possible to add part of the emulsifier mixture prior to the polymerization and to admix the remainder after the polymerization. However, it is more advantageous to add the emulsifier mixture made up of components (a) and (b) to the latex after the polymerization has been terminated and prior to spraying step.

Advantageously, a solution of the emulsifier mixture will first be produced in water-miscible solvents, e.g. in ethanol, propanol, ketones, etc., or in a mixture of equal parts by weight of propanol and water. This solution is added to the polymer dispersion immediately prior to the spraying thereof.

For the spraying or spray drying procedure, the nozzle-equipped spraying plants customary in this technology are employed, as disclosed in the Kirk-Othmer "Encyclopedia of Chemical Technology, 2nd Ed., vol. 7 (1965) under the section "Drying," pages 360–368.

The pastes are prepared in the usual manner, as disclosed for instance, in "Gummi, Asbest, Kunststoffe," vol 23 (1970), No. 9, p. 938; on in "Kunststoff-Handbuch," vol. II, "Polyvinyl Chloride," part 1, edited by K. Krekeler and G. Wick, Munich 1963, pp. 404 et seq.

As the plasticizer, a mixture of a commercial, low-priced "normal gelling agent" such as, e.g., dioctylphthalate, dinonyl phthalate, didecyl phthalate, paraffin-sulfonic acid phenyl/cresyl ester (="Mesamoll" commercial product of Farbenfabriken Bayer), and a so-called quick-gelling agent, such as for example, benzyl butyl phthalate or dibutyl phthalate is suitably employed. Additions of dioctyl adipate or dioctyl sebacate reduce the viscosity of the paste in the desired manner and make it possible to produce foam materials of low foam densities. Similar effects are attained by the addition of secondary plasticizers. The foaming of the paste by beating in air is likewise conducted in the usual manner, such as described, for example, in Industrial & Engineering Chemistry, Product Research and Development, vol. 3, No. 3 (September 1964), pp. 211–212.

During the whipping of air into the mixture, it is to be kept in mind that the paste must not be heated up even, locally, to such an extent that premature gelling occurs. Thus, cooling must be effected if necessary. The temperature range within which the lowest foam densities are attained during the whipping step is from about 30 to 35° C. when the powders of the present invention are used.

With the use of the synthetic resin powders of the present invention, it is possible in a simple manner to produce pastes with plasticizers. However, above all, it is possible with the use of the powders of this invention to produce soft foam materials in accordance with the whipped foam method using emulsifier additions of 0.6–1.9 percent by weight, based on 100 parts of PVC. Furthermore, foam materials of lower foam densities of up to 0.25 g./cc. and an open-pore structure of up to 98 percent and of especially small-pore character are obtained.

Examples of the way in which the present invention is carried out is explained with reference to the following:

Preparation of the Synthetic Resin Powder

Example 1(a)

A solution of 52 kg. of the calcium salt of dodecylbenzenesulfonic acid (a) of 30 kg. of a condensation product of coconut oil fatty acid with 12 moles of ethylene oxide (b) was produced in about 18 kg. of a propanol/water mixture. 22 kg. of this solution (with about 18 kg. of emulsifier mixture) was introduced into an agitator having a capacity of 3 cubic meters, wherein there was provided 2175 kg. of a PVC dispersion with 46 percent solids content (PVC having a K-value of 70). The PVC dispersion was prepared by polymerizing vinyl chloride in an aqueous emulsion as described in the German Pat. 864,455 (1941 to Bayer).

This dispersion was subsequently sprade in a spray tower of usual construction by means of two-fluid nozzles. In this procedure. the tower inlet temperature was 165° C., the tower outlet temperature was 65° C. The sprayed material was subsequently screened in order to reduce the proportion of coarse particles of above 40μ to below 1 percent. The polyvinylchloride powder obtained with 1.8 percent of the total weight as the emulsifier mixture (a)+(b) had a water content of below 0.2 percent.

Preparation of the Foam Paste and the Foam Material

Example 1(b)

In a slowly rotating planetary mixer a plastisol was produced from the following components:

120 parts of PVC suitable for foam whipping, according to Example 1(a)
45 parts of benzyl butyl phthalate
35 parts of dioctyl phthalate In this procedure, first about one-third of the amount of PVC was introduced into the charged plasticizer mixture, and the mixture was agitated for 3 minutes until a smooth, lump-free paste was obtained. Thereafter, the remainder of the PVC was added in two batches in the same manner.

The paste prepared as above was foamed in a rapidly rotating "Euromatic" mixer in the conventional manner by beating air into it. The foamed paste exhibited a density of 0.45 g./cc. In a spreading and gelling plant, as customary for PVC coatings, the foam was poured out in a layer having a thickness of 2 mm. and gelled at 160–175° C. The gelled foam material had a density of 0.46 g./cc. and had an open-pore structure of 98.5 percent (determined by the quantity of water absorbed).

Example 1(c)

By means of a slowly operating laboratory agitator, three pastes A–C were produced containing respectively 120 g. of polyvinylchloride suitable for the foam whipping method (according to Example 1(a) and 45 g. of benzyl butyl phthalate, as well as, in paste A: 35 g. of dioctyl phthalate; in paste B: 35 g. of dioctyl adipate; and in paste C: 35 g. of dioctyl sebacate. These pastes were subsequently processed, in an AEG (Allgemeine Electricitaets-gesellschaft) household mixer, as conventionally used for the preparation of whipped cream into whipped PVC foam. The following foam densities resulted:

| | G./cc. |
|---|---|
| Paste A | 0.55 |
| Paste B | 0.40 |
| Paste C | 0.41 |

Example 2

10 kg. of a PVC dispersion (with 46 percent solids content, K-value 70), prepared by emulsion polymerization of vinyl chloride as described in the French Pat. 883,454, was mixed with 220 g. of a solution of 52 parts by weight of calcium n-dodecylbenzenesulfonate and 30 parts by weight of a coconut fatty acid-ethylene oxide condensation product (12 moles of ethylene oxide) in 18 parts by weight of a propanol/water mixture. The dispersion was thereafter spray-dried as described in Example 1(a) and also screened. Of the dry PVC powder thus obtained, 120 parts were made into a paste in 80 parts of a plasticizer mixture of benzyl butyl phthalate and dioctyl phthalate (45:35) and thereafter foamed in the usual manner by whipping air into it in an "Euromatic" mixer. The foamed paste had a foam density of 0.45 g./cm.$^3$. The foamed paste was gelled in an oven into a foam material having a density of 0.45 g./cm.$^3$ (corresponding approximately to the paste density) by using a gelling temperature of 175–180° C. and 2 minutes in a circulating air oven.

Example 3

10 kg. of a PVC dispersion (with 46 percent solids content, K-value 70), prepared by emulsion polymerization of vinyl chloride as set forth in Example 2, was mixed with 220 g. of a solution of 41 parts by weight of calcium n-dodecylbenzenesulfonate and 41 parts by weight of a coconut fatty acid-ethylene oxide condensation product (12 moles of ethylene oxide) in 18 parts by weight of a propanol/water mixture. The dispersion was then spray-dried and screened as set forth in Example 1(a). Of the dry PVC powder thus obtained, 120 parts were processed into a paste in respectively 80 parts of a plasticizer mixture of benzyl butyl phthalate and dioctyl phthalate (45:35) and subsequently foamed in the usual manner by beating air into it in an "Euromatic" mixer. The foamed paste had a foam density of 0.43 g./cm.$^3$. The foamed paste was gelled in an oven to a foam material corresponding approximately in its density to the density of the paste (gelling temperature: 175–180° C.— 3 minutes in a circulating air oven).

Example 4

10 kg. of a PVC dispersion (with 46 percent solids content, K-value 70), prepared by emulsion polymerization of vinyl chloride as set forth in Example 2, was mixed with 220 g. of a solution of 38 parts by weight of calcium n-dodecylbenzenesulfonate and 44 parts by weight of a coconut fatty acid-ethylene oxide condensation product (12 moles of ethylene oxide) in 18 parts by weight of a propanol/water mixture. The dispersion was spray-dried and screened as set forth in Example 1(a). Of the dry PVC powder obtained, 120 parts were made into a paste in respectively 80 parts of a plasticizer mixture of benzyl butyl phthalate and dioctyl phthalate (45:35) and thereafter foamed in the usual manner by beating air into it in a "Euromatic" mixer. The foamed paste had a foam density of 0.44 g./cm.$^3$. The foamed paste was gelled in an oven into a foam material corresponding approximately in its density to the paste density (gelling temperature: 175–180° C.—3 minutes in a circulating air oven).

Examples 5 through 10

A polyvinylchloride dispersion with a 45.5 percent solids content and a K-value of 70 was prepared by emulsion polymerization as set forth in Example 2. Each of the solutions Nos. 5 through 10, as listed in the following table, was added to a 10 kg. portion of this dispersion.

TABLE I

| Solution number | 5 | 6 | 7 | 8 | 9 | 10 |
|---|---|---|---|---|---|---|
| Calcium salt of the cetyl-benzenesulfonic acid, g. | 50 | 40 | 60 | 50 | 40 | 60 |
| Condensation product of nonyl-phenol with 6 ethylene oxide, g. | 50 | 60 | 40 | | | |
| Condensation product of octyl-phenol with 6 ethylene oxide, g. | | | | 50 | 60 | 40 |
| Water/propylene mixture (1:3), g. | 25 | 25 | 25 | 25 | 25 | 25 |

The mixture thus prepared were spray-dried as described in Example 1 (2) and also screened. The dry PVC powders were made into a paste, using 120 parts of PVC and 80 parts of a plasticizer mixture of benzyl butyl phthalate and dioctyl phthalate (45:35). Foaming of the pastes in the usual manner by whipping air into them in a "Euromatic" mixer resulted in foamed pastes of the following densities, and the foam material densities obtained after gelation, resp.:

TABLE II

| Paste form PVC number | 5 | 6 | 7 | 8 | 9 | 10 |
|---|---|---|---|---|---|---|
| Foamed paste density (g./cm.$^3$) | 38 | 49 | 35 | 38 | 55 | 36 |
| Foam material density (g./cm.$^3$) | 38 | 50 | 36 | 38 | 58 | 35 |

Examples 11 through 16

Each of the solutions as listed in the following Table III was added to a 10 kg. batch of a polyvinyl chloride dispersion that had been prepared as described in Example 2.

TABLE III

| Solution number | 11 | 12 | 13 | 14 | 15 | 16 |
|---|---|---|---|---|---|---|
| Calcium salt of the n-dodecylbenzene sulfonic acid, g. | 50 | | 50 | 35 | 60 | 65 |
| Calcium salt of the iso-dodecylbenzene sulfonic acid, g. | | 50 | | | | |
| Condensation product of a coconut fatty acid with 12 moles of ethylene oxide, g. | 50 | 50 | 60 | 65 | 40 | 35 |
| Water/propanol mixture (1:3), g. | 25 | 25 | 25 | 25 | 25 | 25 |

The mixtures prepared in this manner were then spray-dried as set forth in Example 1(a) and screened. The dry PVC powders were made into pastes as described in Example 4 and subsequently foamed by beating air into them in a "Euromatic" mixer. The foamed paste densities and the densities of the foam material after gelation are listed in the following table:

TABLE IV

| Paste from PVC number | 11 | 12 | 13 | 14 | 15 | 16 |
|---|---|---|---|---|---|---|
| Foamed paste density (g./cm.$^3$) | 42 | 49 | 48 | 52 | 35 | 34 |
| Foam material density (g./cm.$^3$) | 41 | 50 | 48 | 53 | 36 | 35 |

We claim:
1. In a process for making a plasticized vinyl resin open-cell sponge which comprises mechanically frothing a plastisol comprising 100 parts by weight of a particulate thermoplastic vinyl resin selected from the group consisting of polyvinylchloride and copolymers of vinylchloride, and from 50–400 parts of high boiling organic liquid plasticizer for the resin and thereby incorporating a surrounding gas into the mixture, subsequently heating the resulting froth at a temperature and for a time sufficient to fuse the resin particles with the plasticizer while maintaining the froth structure, and cooling the resulting material to room temperature, the improvement comprising said particulate thermoplastic vinyl resin having adsorbed on the surface thereof an emulsifier mixture consisting essentially of:
(a) the calcium salt of an alkyl benzenesulfonic acid having 8–16 carbon atoms in the alkyl chain,
(b) a compound having the formula

wherein
A represents a C=O group or a phenyl group,
R represents an alkyl group having 8–20 carbon atoms,
$n$ represents integers from 1 to 12, and
$x$ stands for zero or 1, and wherein the emulsifier mixture is about 0.1 to 5 percent by weight of said particulate thermoplastic vinyl resin and the weight ratio of (a) to (b) is about 2:1 to 1:2.

References Cited
UNITED STATES PATENTS
2,861,963  11/1958  Butsch _____ 260—2.5 P
3,067,151  12/1962  Terry et al. _____ 260—2.5 P MURRAY TILLMAN, Primary Examiner M. FOELAK, Assistant Examiner U.S. Cl. X.R.

260—2.5 L, 29.6 MQ, 29.6 ME, 30.6 R, 30.8 R, 31.8 R, 33.4 R, 41 R, 45.75 R, 45.75 K, 891